(12) United States Patent
Guillez et al.

(10) Patent No.: US 7,004,529 B2
(45) Date of Patent: Feb. 28, 2006

(54) DEVICE FOR OPENING AND CLOSING THE HOOD OF A FOLDING-TOP CONVERTIBLE MOTOR VEHICLE

(75) Inventors: Jean-Marc Guillez, Cirieres (FR); Paul Queveau, Montravers (FR); Gérard Queveau, Le Pin (FR)

(73) Assignee: Societe Europeenne des Brevets Automobiles, (FR)

( * ) Notice: Subject to any disclaimer, the term of this patent is extended or adjusted under 35 U.S.C. 154(b) by 0 days.

(21) Appl. No.: 10/500,903

(22) PCT Filed: Dec. 31, 2002

(86) PCT No.: PCT/FR02/04590

§ 371 (c)(1),
(2), (4) Date: Oct. 26, 2004

(87) PCT Pub. No.: WO03/059671

PCT Pub. Date: Jul. 24, 2003

(65) Prior Publication Data

US 2005/0046221 A1    Mar. 3, 2005

(30) Foreign Application Priority Data

Jan. 4, 2002 (FR) .................................. 02 00102

(51) Int. Cl.
*B60J 7/20*   (2006.01)

(52) U.S. Cl. .................................... 296/76; 296/107.08
(58) Field of Classification Search ............... 296/37.1, 296/76, 107.08
See application file for complete search history.

(56) References Cited

U.S. PATENT DOCUMENTS

| | | | |
|---|---|---|---|
| 5,823,606 A | 10/1998 | Fussnegger et al. | |
| 6,092,335 A | 7/2000 | Guillez et al. | |
| 6,186,577 B1 | 2/2001 | Guckel et al. | |
| 6,811,206 B1 * | 11/2004 | Wagner | 296/76 |
| 6,824,194 B1 * | 11/2004 | Weissmueller et al. | 296/76 |
| 6,857,686 B1 * | 2/2005 | Willard | 296/76 |
| 6,916,058 B1 * | 7/2005 | Krajenke | 296/76 |

* cited by examiner

*Primary Examiner*—Jason Morrow
(74) *Attorney, Agent, or Firm*—Bachman & LaPointe, P.C.

(57) ABSTRACT

A device comprising, additionally to the main jack, a balancing jack designed to facilitate manual opening of the hood from the in a forward movement for storing luggage in the trunk, and manual closure of hood in the opposite direction. The balancing jack has its base linked to the main jack and the free end of its piston rod fixed in articulation to the hood. It is designed so as not to obstruct the operation of the main jack for automatically opening or closing the hood. The device further comprises a device for actuating the balancing jack to enable the hood to be manually opened or closed.

18 Claims, 2 Drawing Sheets

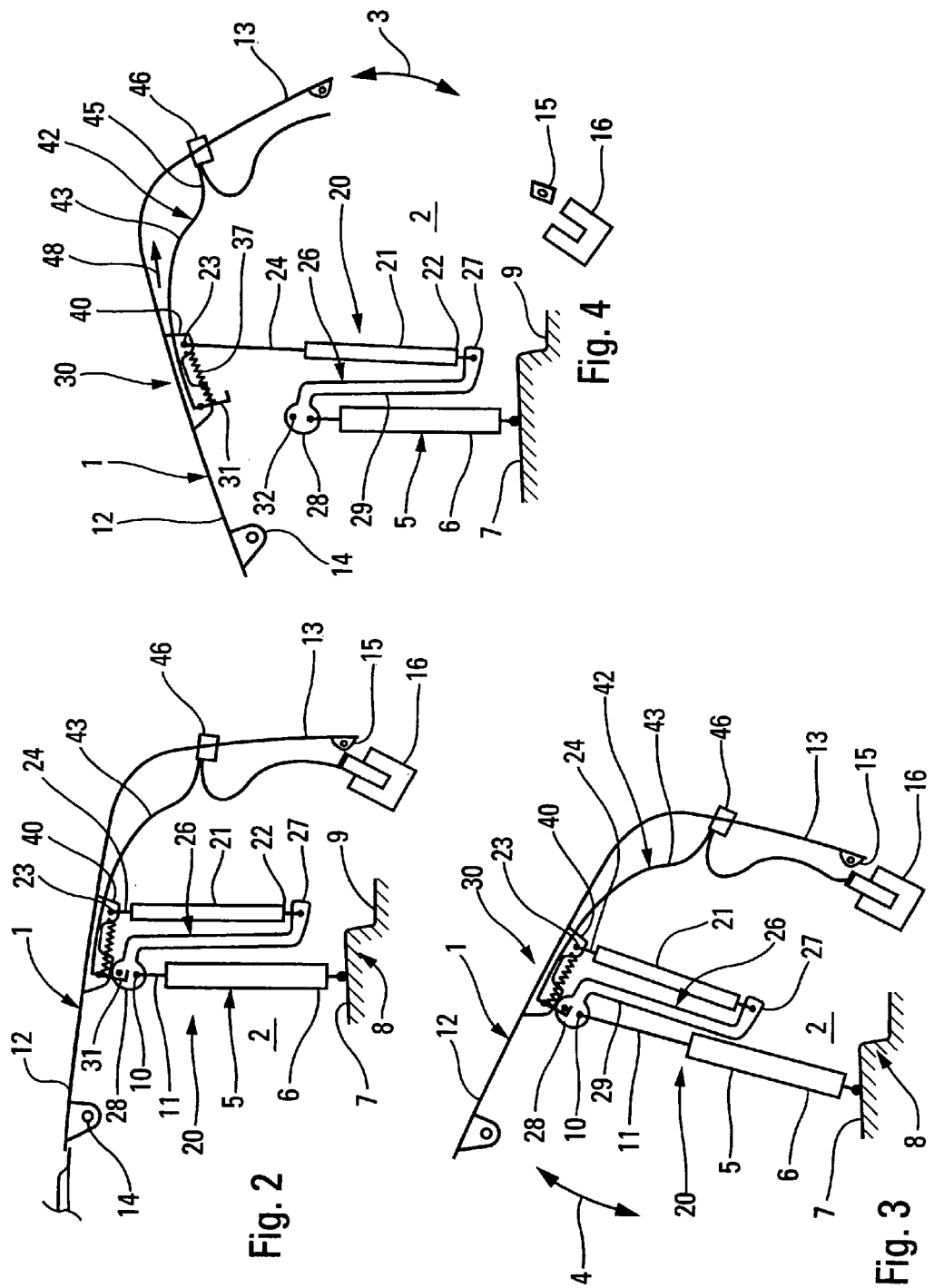

DEVICE FOR OPENING AND CLOSING THE HOOD OF A FOLDING-TOP CONVERTIBLE MOTOR VEHICLE

BACKGROUND OF THE INVENTION

This invention relates to a device for opening and closing the hood of a folding-top convertible motor vehicle.

For example, French patent application FR-A-2 777241 in the name of the applicant describes a device of the above-mentioned type that includes means for controlling opening of the hood in the forward direction to store luggage in the trunk and opening of the said hood in the backward direction to pass and store the folded roof in the trunk.

This opening is controlled by at least one main jack, the base of which is installed in an articulated manner on a part of the bodywork adjacent to the bottom of the trunk, and the free end of the rod of which is fixed to the said hood.

However, it happens that some users of such a device would like to be able to open and close the hood of the trunk of their vehicle manually, for example so that they can control such an operation without needing to enter inside the said vehicle.

SUMMARY OF THE INVENTION

The purpose of this invention is to overcome the disadvantages of known devices and to propose a device of the above-mentioned type for manually opening and closing the hood of the trunk of a convertible vehicle.

According to this invention, the device of the above-mentioned type is characterised in that it also comprises for each main jack a balancing jack adapted to facilitate manual opening of the hood in the forward direction for the storage of luggage in the trunk, and manual closing of the said trunk in the opposite direction, this balancing jack having its base connected to the main jack and the free end of its rod fixed in an articulated manner to the hood and being arranged so that it does not hinder operation of the main jack for automatically opening and closing of the hood, the device also including means for making the balancing jack inactive so as to authorise automatic opening or closing of the hood, and means for making the balancing jack active so as to authorise manual opening or closing of the hood.

The device thus enables the two operating modes (automatic and manual), of the hood opening and closing operations.

According to one advantageous embodiment of the invention, the device comprises an intermediate device substantially in the shape of an S of which the lower end is fixed in an articulated manner to the base of the balancing jack and of which the top end is fixed in an articulated manner to the free end of the rod of the main jack.

According to one preferred embodiment of the invention, the device also comprises locking means for detachably fixing the top end of the intermediate device to the hood, and means for displacing the said locking means to release the top end of the intermediate device from the hood.

Thus, when the top end of the intermediate device is fixed to the hood, the main jack can automatically open and close the hood.

On the other hand, when the top end of the intermediate device is separated from the hood, the hood can be opened or closed manually with the assistance of the balancing jack.

Other special features and advantages of this invention will become clear from the following description given below.

BRIEF DESCRIPTION OF THE DRAWINGS

Among the appended drawings given as non-limitative examples only:

FIG. 2 is a view similar to FIG. 1 illustrating an embodiment of the device according to the invention, the hood being in its closed position;

FIG. 3 is a view similar to FIG. 2, the hood being in its backward open position;

FIG. 4 is a view similar to FIG. 2, the hood being in its forward open position;

DETAILED DESCRIPTION OF PREFERRED EMBODIMENT(S)

Figure 1:
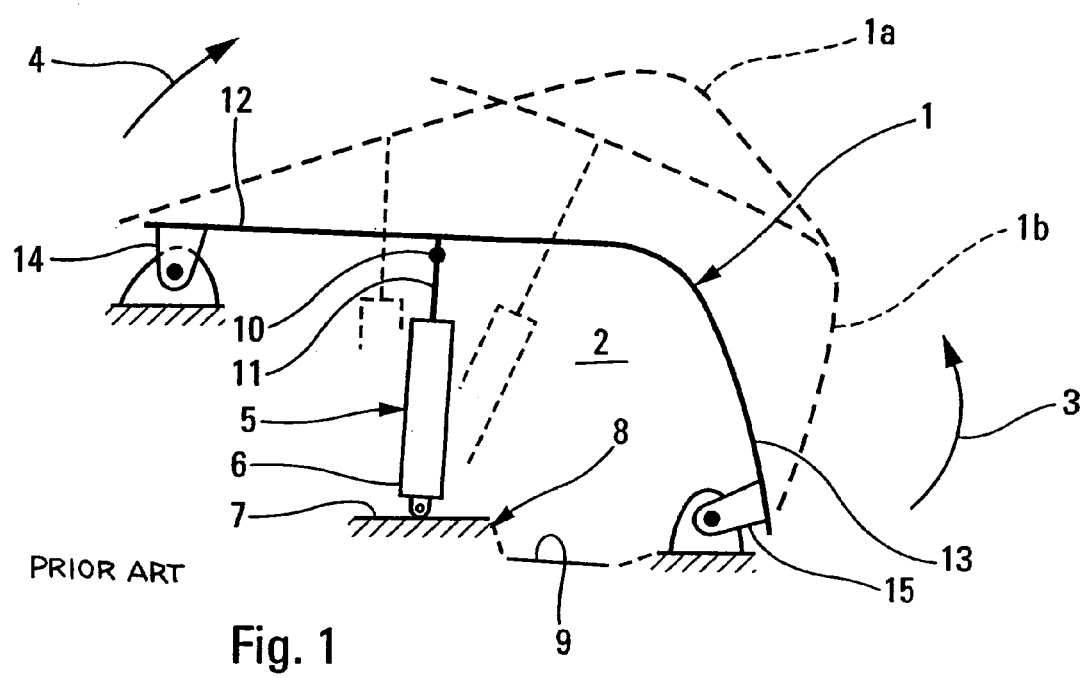
FIG. 1 is a diagrammatic longitudinal sectional view of a vehicle illustrating a device according to the prior art.

In the embodiment shown in FIG. 1, the hood 1 of the trunk 2 of a folding-top convertible vehicle (not shown) can be opened in the forward direction along the direction of arrow 3, towards the position marked 1a, to store luggage in the trunk and more generally for access to the trunk from the back of the vehicle. The hood 1 may also be opened in the backward direction along the direction of arrow 4 towards the position marked 1b, to pass and store the folded roof in the trunk 2.

Opening of the hood 1 is controlled by at least one main jack 5, the base 6 of which is installed in an articulated manner on a part 7 of the bodywork 8 adjacent to the bottom 9 of the trunk 2.

In general, a main jack 5 is installed on each side of the trunk 2 along a corresponding lateral wall in the trunk 2.

The free end 10 of the rod 11 of the jack 5 is fixed to the hood 1.

The front edge 12 and the back edge 13 of the hood 1 are connected to the bodywork 8 of the vehicle by means of corresponding front locks 14 and back locks 15, each having the function of locking and articulating the hood 1 such that the said hood 1 can open in either the backward direction (arrow 4) or the forward direction (arrow 3).

In the detailed description of an embodiment of the device according to this invention, the same reference numbers are used for elements of the invention that are identical to elements mentioned above in the device according to the prior art.

According to this invention, the device 20 also comprises, for each main jack 5, a balancing jack 21 adapted to facilitate manual opening of the hood 1 in the forward direction, in the direction of arrow 3, to store luggage in the trunk 2 and manual closing of the said hood 1 in the reverse direction. The balancing jack 21 is any known type of balancing jack that is independent and does not require any connection to any energy source whatsoever.

The balancing jack 21 has its base 22 connected to the main jack 5, and the free end 23 of its rod 24 fixed to the hood 1 in an articulated manner.

The balancing jack 21 is arranged so that it does not hinder the operation of the main jack 5 for automatic opening or closing of the hood 1.

The device 20 also comprises means 25 for making the balancing jack 21 inactive so as to authorise automatic opening or closing of the hood 1, and means for making the balancing jack 21 active so as to authorise manual opening or closing of the hood 1.

As shown in FIGS. 2 to 4, the device 21 comprises an intermediate device 26 approximately in the form of an S, of which the lower end 27 is fixed in an articulated manner to the base 22 of the balancing jack 21 and of which the top end 28 is fixed in an articulated manner to the free end 10 of the rod 11 of the main jack 5.

In the embodiment shown, the intermediate device 26 comprises a main body 29 extending approximately parallel to the main jack 5 and the balancing jack 21 when the hood 1 is in its closed position shown in FIG. 2.

The lower end 27 of the device 26 is composed of a transverse prolongation of the body 29 extending under the balancing jack 21.

The top end 28 of the intermediate device 26 consists of a transverse prolongation of the body 29 extending above the main jack 5.

The device 20 comprises locking means 30 for detachably fixing the top end 28 of the intermediate device 26 to the hood 1, and means for displacing the said locking means 30 so as to release the top end 28 of the intermediate device 26 from the hood 1.

Figure 5:
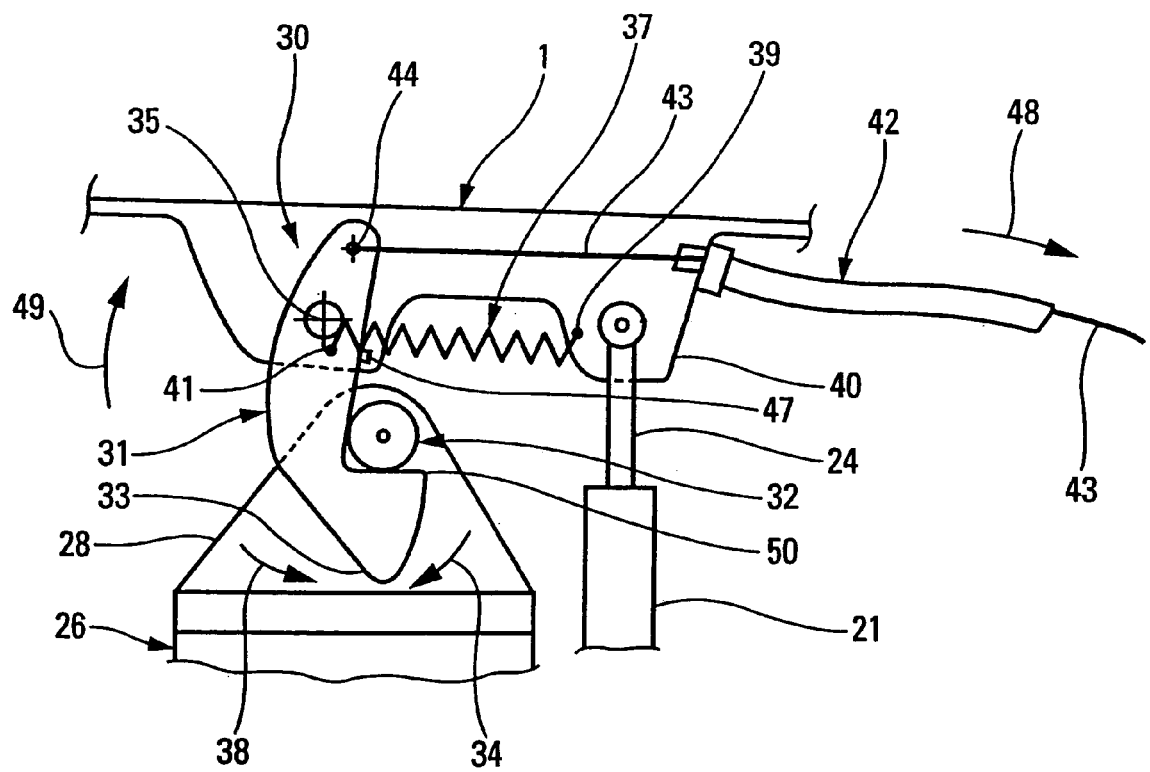
FIG. 5 is an enlarged diagrammatic view of a detail of FIG. 2.

In the example in FIG. 5, the hood 1 is provided with a hook 31 pivotally installed on the hood 1. The top end 28 of the intermediate device 26 is provided with a latch 32, the hook 31 being adapted to engage the latch 32 to fix the top end 28 of the intermediate device 26 to the hood 1.

In this example, the bottom part 33 of the hook 31 is shaped so that it can be pushed by the latch 32 when the hood 1 closes, as shown diagrammatically by arrow 34, and the hook 31 is adapted to automatically engage the latch 32 when the hood 1 is closed.

In this example, the hook 31 is arranged so as to be able to pivot about a first pin 35 with respect to the hood 1, and the latch 32 is a second pin 32 approximately parallel to the first pin 35.

A spring 37 is arranged to permanently urge the hook 31 in the closing direction of the hook 31, this direction being shown diagrammatically by arrow 38.

In this case the spring 37 is a tension spring fixed at a first end 39 to a plate 40 fixed to the hood 1 and at its other end 41 to the hook 31.

The hood 1 also comprises means 42 for pivoting the hook 31 in order to release it from its position engaged with the latch 32 shown in FIG. 5.

In this case, the hood 1 comprises a cable 43, one end 44 of which is fixed to the hook 31 and the other end 45 of which is fixed to a control element, shown diagrammatically in 46, supported by the hood 1, which for example may be a push-button or a lever of any known type supported on the hood 1 and which may also control a lock of any type whatsoever, shown diagrammatically in 16.

In the example in FIG. 5, the first pivot pin 35 of the hook 31 is supported by plate 40, and the end 44 of the cable 43 is located on the hook 31 opposite the end 41 of the spring 37 with respect to the pin 35.

The plate 40 also supports a stop 47, and the hook 31 is held in permanent contact with this stop by the tension applied by the spring 37.

In this example, tension applied to the cable 43 in the direction of the arrow 48 towards the right in the figure, makes the hook 31 to pivot in the direction of the arrow 49 in the clockwise direction in the figure, to release the hook 31 from its position engaged with the latch 32.

This operation eliminates all connections between the plate 40 and firstly the hood 1, and secondly the top end 28 of the intermediate device 26.

Under these conditions, with the main jack 5 not being activated, an upward force in the direction of the arrow 3 applied to the back edge 13 of the hood 1 makes it possible to open the hood 1 as far as its open position la to provide access to the trunk 2, the balancing jack 21, facilitating this opening manoeuvre and holding the hood 1 in its open position.

On the other hand, pushing downwards on the back edge 13 of the hood 1 makes the hood 1 to pivot in the direction of arrow 4 as far as its closed position in FIG. 2 with the assistance of the balancing jack 21.

In these two manoeuvres, the user can thus proceed in the same way as for a trunk hood with manual opening or closing, with the same habits and the same care and caution reflexes.

At the end of the closing operation, the bottom part 33 of the hook 31 comes into contact with the latch 32 and is shaped so as to make the hook 31 to pivot in the direction of the arrow 49 against the action of the spring 37 until the tip 50 of the hook 31 can pass under the latch 32.

This final operation puts the cable 43 and the control element 46 back into the position that each occupies when the hook 31 is in its position engaged with the latch 32 to fix the top end 28 of the intermediate device 26 to the hood 1.

Thus, when the hook 31 is engaged with the latch 32, as shown diagrammatically in FIG. 5, the balancing jack 21 is locked in its retracted position and the jack 5 can control automatic opening and closing of the hood 1 in either direction (arrow 4 in FIG. 3).

On the contrary, when the hook 31 is pivoted by pulling the cable 43 so as to move said hook away from its position engaged with the latch 32, the balancing jack 21 is released while the main jack 5 is inactive, and it is possible to open the hood manually in the forward direction to access the trunk 2 or to close the trunk manually, the trunk opening and closing operations being facilitated by the balancing jack 21.

Obviously, this invention is not limited to the embodiments that have just been described, and many changes and modifications could be made to them without going outside the scope of the invention.

For example, it would thus be possible to replace the mechanical locking means 30 described above by equivalent hydraulic or electrical means fulfilling the same function to obtain the same result.

Conventional guide and/or support means could also be provided between the intermediate device 26 and firstly the first main jack 5, and secondly the balancing jack 21.

What is claimed is:

1. A device for opening and closing a hood of a trunk provided on a folding-top convertible vehicle comprising a bodywork, a foldable roof, the trunk, and said hood thereof, the trunk having a bottom, the device including:

controlling means for controlling a first opening of the hood in a forward direction to store luggage in the trunk and a second opening of said hood in an opposite backward direction to pass and store a folded roof in the trunk, a main jack operated for controlling said first and second openings, said main jack having a base which is articulated on a part of the bodywork adjacent to the bottom of the trunk, and a rod having an end fixed to said hood, a balancing jack adapted to facilitate a manually-operated opening of the hood in the forward direction and a manually-operated closing of the hood in the opposite backward direction, the balancing jack having a base connected to the main jack and a rod having an end articulated on the hood, the balancing jack being arranged to prevent interference with operation of the main jack for automatically opening and closing the hood, balancing jack inactivation means for making the balancing jack inactive so as to authorize automatic opening or closing of the hood, and balancing jack activation means for making the balancing jack active so as to authorize manual opening or closing of the hood.

2. The device of claim 1, further comprising an intermediate member having a substantially S shape, a lower end fixed in an articulated manner to the base of the balancing jack, and a top end articulated on said end of the rod of the main jack.

3. The device of claim 2, further comprising locking means for detachably fixing the top end of the intermediate member to the hood, and displacing means for displacing said locking means so that the top end of the intermediate member is released from the hood.

4. The device of claim 3, wherein:

the hood is provided with a hook pivotally installed on the hood, the top end of the intermediate member is provided with a latch, and the hook is adapted to engage said latch to fix the top end of the intermediate member to the hood.

5. The device of claim 4, wherein the hook has a part which is shaped so that it can be pushed by the latch when the hood is being closed, and the hook is adapted to engage the latch when said hood is closed.

6. The device of claim 5, wherein the hook is arranged so as to pivot about a first pin with respect to the hood, and the latch comprises a second pin parallel to the first pin, and a spring being arranged to permanently urge the hook in the closing direction of the hook.

7. The device of claim 4, wherein the hood comprises pivoting means for pivoting the hook in order to release said hook from a position engaged with the latch.

8. The device of claim 4, wherein the hood comprises a cable having a first end fixed to the hook and a second end fixed to a control element supported by the hood, for pivoting the hook in order to engage said hook with said latch or to release said hook from said engagement.

9. The device of claim 1, wherein the hood has a front edge and a back edge which are both connected to the bodywork of the vehicle by means of respective front locks and back locks, each having the function of locking and articulating the hood such that said hood is adapted to be opened in either the backward direction or the forward direction.

10. A folding-top convertible vehicle, comprising a folding-top, a trunk, a trunk hood, a bodywork, and a device for opening and closing said trunk hood, the device including:

controlling means for controlling a first opening of the hood in a forward direction to store luggage in the trunk and a second opening of said hood in an opposite backward direction to pass and store a folded roof in the trunk, a main jack operated for controlling said first and second openings, said main jack having a base which is articulated on a part of the bodywork adjacent to a bottom of the trunk, and a rod having an end fixed to said hood, a balancing jack adapted to facilitate a manually-operated opening of the hood in the forward direction and a manually-operated closing of the hood in the opposite backward direction, the balancing jack having a base connected to the main jack and a rod having an end articulated on the hood, the balancing jack being arranged to prevent interference with operation of the main jack for automatically opening and closing the hood, balancing jack inactivation means for making the balancing jack inactive so as to authorize automatic opening or closing of the hood, and balancing jack activation means for making the balancing jack active so as to authorize manual opening or closing of the hood.

11. The vehicle of claim 10, further comprising an intermediate member having a substantially S shape, a lower end fixed in an articulated manner to the base of the balancing jack, and a top end articulated on said end of the rod of the main jack.

12. The vehicle of claim 11, further comprising locking means for detachably fixing the top end of the intermediate member to the hood, and displacing means for displacing said locking means so that the top end of the intermediate member is released from the hood.

13. The vehicle of claim 12, wherein:

the hood is provided with a hook pivotally installed on the hood, the top end of the intermediate member is provided with a latch, and the hook engages said latch to fix the top end of the intermediate member to the hood.

14. The vehicle of claim 13, wherein the hook has a part which is shaped so that it can be pushed by the latch when the hood is closing, and the hook is adapted to automatically engage the latch when the hood is closing.

15. The vehicle of claim 14, wherein the hook is arranged so as to pivot about a first pin with respect to the hood, and the latch comprises a second pin parallel to the first pin, and a spring being arranged to permanently urge the hook in the closing direction of the hook.

16. The vehicle of claim 13, wherein the hood comprises pivoting means for pivoting the hook in order to release said hook from a position engaged with the latch.

17. The vehicle of claim 13, wherein the hood comprises a cable having a first end fixed to the hook and a second end fixed to a control element supported by the hood, pivoting the hook in order to engage said hook with said latch or to be released from said engagement.

18. The vehicle of claim 10, wherein the hood has a front edge and a back edge which are both connected to the bodywork of the vehicle by means of respective front locks and back locks, each having the function of locking and articulating the hood such that said hood is adapted to be opened in either the backward direction or the forward direction.

* * * * *